United States Patent [19]
Barrere, Jr. et al.

[11] 3,713,272
[45] Jan. 30, 1973

[54] PROCESS FOR RECOVERING CONDENSIBLE COMPONENTS FROM A GAS STREAM

[75] Inventors: Clem A. Barrere, Jr., Houston, Tex.; Burton M. Casad, Ponca City, Okla.

[73] Assignee: Continental Oil Company, Ponca City, Okla.

[22] Filed: Aug. 26, 1971

[21] Appl. No.: 175,229

[52] U.S. Cl. ........................................... 55/33, 55/62
[51] Int. Cl. ............................................. B01d 53/04
[58] Field of Search ........ 55/33, 62, 74, 75, 179, 387, 55/389

[56] References Cited

UNITED STATES PATENTS

| | | | |
|---|---|---|---|
| 3,243,938 | 4/1966 | Lavery et al. | 55/62 |
| 3,458,973 | 8/1969 | Spencer et al. | 55/62 |
| 3,527,024 | 9/1970 | McMinn et al. | 55/62 |

*Primary Examiner*—Charles N. Hart
*Attorney*—Joseph C. Kotarski et al.

[57] ABSTRACT

The present invention relates to an improved cyclic process for recovering condensible components from a gas stream utilizing a plurality of stationary absorbent beds. By the present invention, during a first part of each cycle the gas stream is passed through a first bed so that condensible components are absorbed therefrom, the first part of each cycle being equal to the time required for the residue gas from the first bed to reach a condensible component content of a predetermined level. A second bed is simultaneously cooled with a cooling gas stream which is confined within a closed circuit so that the second bed is prevented from becoming preloaded with condensible components during the cooling thereof. During the remainder of each cycle the gas stream is passed serially through the first and second beds so that additional condensible components are absorbed on the first bed and condensible components contained in the residue gas from the first bed are absorbed on the second bed. A third bed is heated and stripped during each cycle with a regeneration gas stream and condensible components are recovered from the regeneration gas stream.

12 Claims, 5 Drawing Figures

INVENTORS
CLEM A. BARRERE JR. &
BURTON M. CASAD

BY Gerald L. Floyd
ATTORNEY

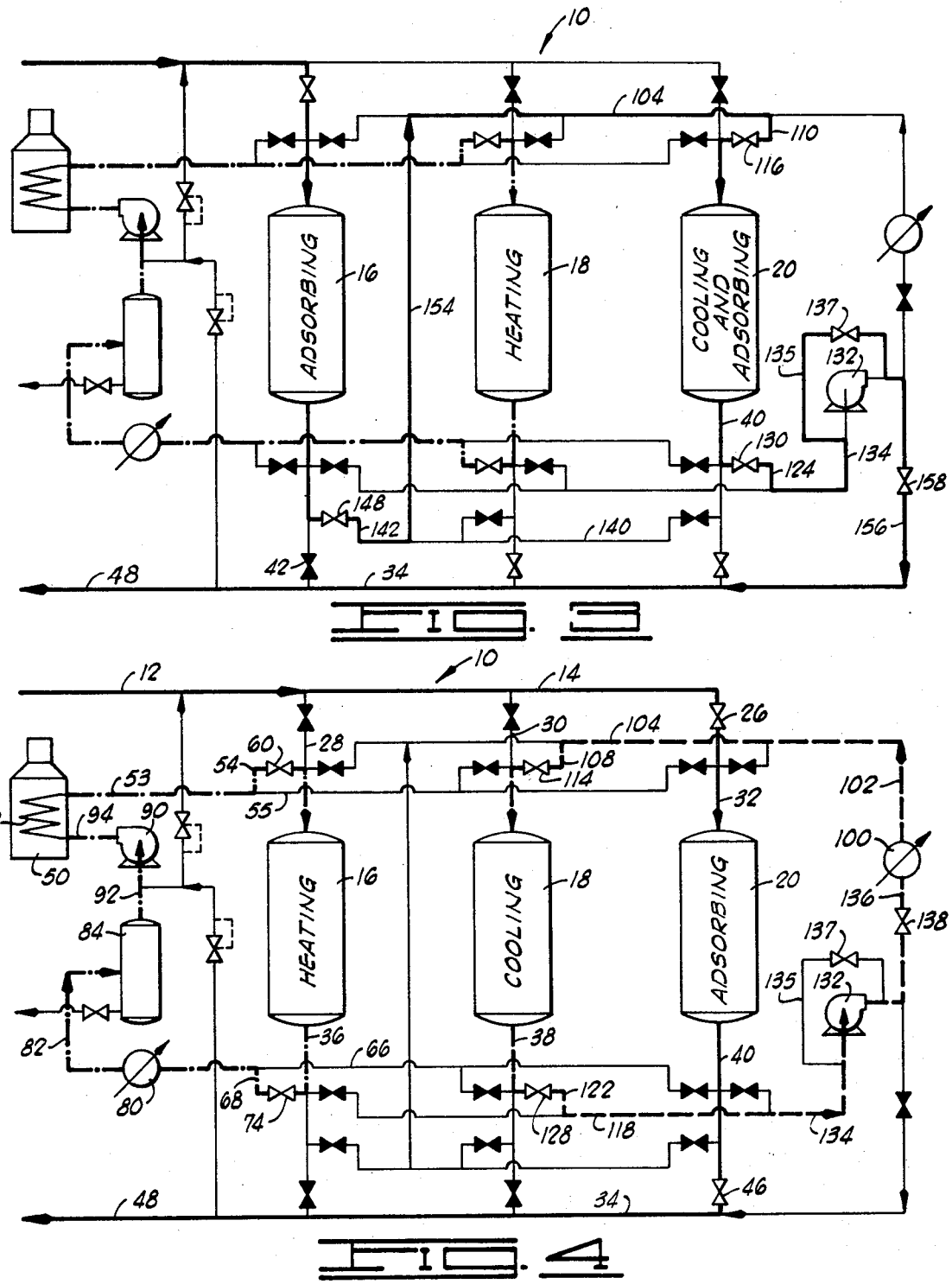

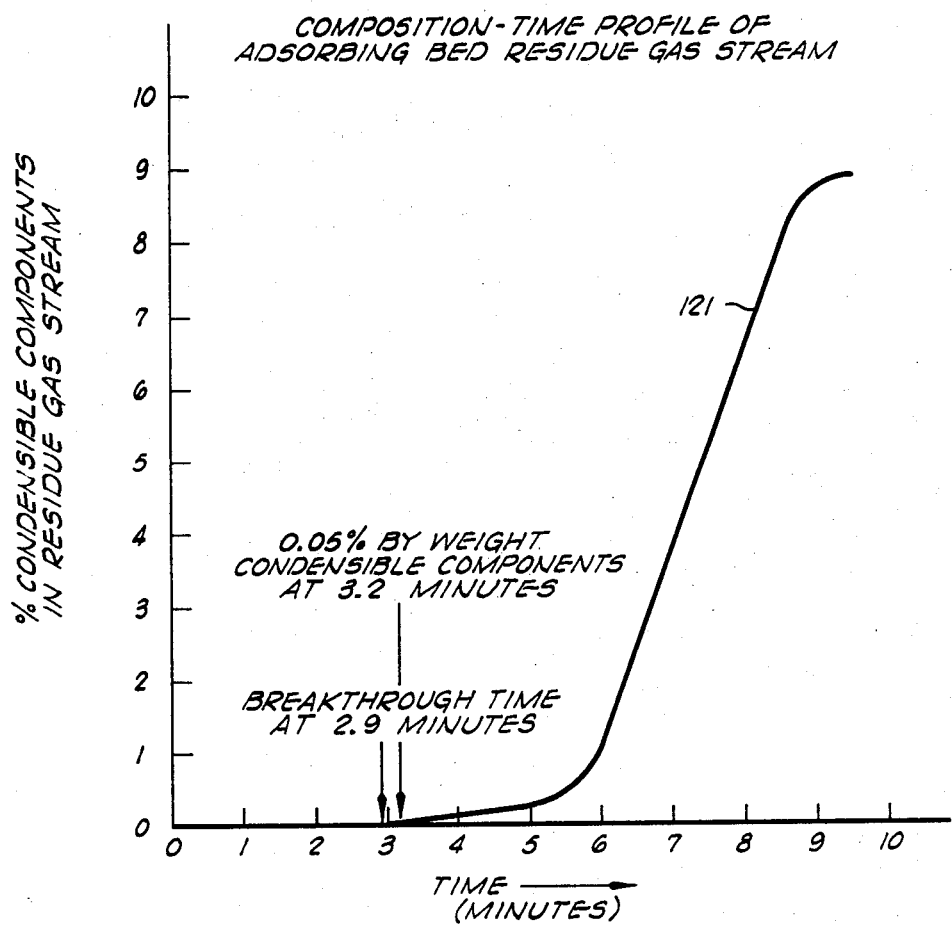
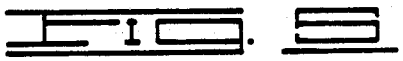

PROCESS FOR RECOVERING CONDENSIBLE COMPONENTS FROM A GAS STREAM

BACKGROUND OF THE INVENTION

1. Field of the Invention

The present invention relates generally to an improved process for recovering condensible components from a gas stream, and more particularly, but not by way of limitation, to a continuous cyclic process for adsorbing and recovering condensible components from a gas stream which process utilizes a plurality of stationary solid adsorbent beds.

2. Description of the Prior Art

Many continuous cyclic stationary adsorbent bed processes have been developed of the type wherein one or more beds are utilized for adsorbing condensible components from a gas stream while the other beds are being regenerated. The term "condensible components" is used herein to mean readily condensible gas components contained in the gas stream to be processed. For example, hydrocarbon compounds generally referred to as "heavy hydrocarbons" such as propane, butane, pentane, hexane, etc., and water are contained in natural gas streams and are readily condensible at moderate temperatures and pressures. A variety of solid adsorbents are commercially available for selectively adsorbing desired condensible components from gas streams. For example, solid adsorbents such as activated charcoal, activated alumina and a variety of silica compounds are commonly used to adsorb heavy hydrocarbons and water from natural gas streams. In these prior processes, regeneration of the adsorbent bed or beds which are saturated with condensible components is accomplished by heating the bed or beds with a portion of the inlet gas in an open cycle, or with a closed cycle of regeneration gas, thereby stripping out the condensible components. The condensible component rich regenerated gas is continuously cooled so that the condensible components are condensed and recovered therefrom. The hot stripped bed is cooled with a gas stream which commonly is the stream used for heating and stripping the adsorption beds which has been cooled and the desired components removed therefrom. In other processes, all or part of the inlet gas stream is used to cool the hot stripped bed, or a cooling gas stream confined within a closed cycle is used which is communicated with the inlet or residue gas stream so that make up gas is provided to the cooling gas stream. To obtain a continuous process, the adsorbent beds are continuously switched or cycled so that the bed or beds which have just adsorbed condensible components are heated and stripped, the bed or beds which have just been heated and stripped are cooled, and the bed or beds which have just been cooled adsorb additional condensible components from the gas stream. The length of each cycle or time period between switching the beds is predetermined based on various design factors such as the volume and composition of the gas stream being processed, the particular components desired to be recovered, the quantity of solid adsorbent contained in each bed and very often, the desired composition of the residue gas produced by the process.

It is desirable to produce a residue gas stream having a condensible component content below a predetermined level using a minimum quantity of solid adsorbent not only to achieve a maximum condensible component recovery, but also to produce a residue gas stream relatively free of condensible components so that subsequent condensation does not occur when the residue gas stream is subjected to low temperature or high pressure conditions. Since solid adsorbents of the type herein described are expensive, and the size and cost of the vessels and equipment required to carry out a cyclic adsorption process are directly proportional to the quantity of adsorbent used, it is desirable in every application to utilize a minimum quantity of solid adsorbent in obtaining the desired condensible component recovery. Heretofore, the length of each cycle has necessarily been based on the time required for condensible components to reach the maximum acceptable level in the residue gas stream leaving the bed which is adsorbing condensible components from the inlet gas stream. That is, as the inlet gas stream is passed through the adsorbing bed, condensible components are adsorbed on the bed. The resulting residue gas is initially substantially free of condensible components. However, after an initial period of time, as the quantity of components adsorbed on the bed increases, the equilibrium between the components in the gas stream and those adsorbed on the bed shifts such that the condensible component content of the residue gas stream increases. Stated another way, as the cycle time of the process is increased beyond the time required for condensible components to first appear in the residue gas, referred to herein as the "breakthrough time", the condensible component content of the residue gas stream from the adsorbing bed also increases. Thus, heretofore, the maximum cycle time of a particular process has been limited to the time required for the residue gas exiting from the adsorbing bed to reach a condensible component content of a predetermined maximum level. Consequently, the adsorption capacity of the adsorbing bed remaining after the residue gas reaches the maximum level is not utilized.

By the present invention an improved process is provided wherein a greater portion or all of the total adsorption capacity of the adsorbent beds is advantageously utilized resulting in less solid adsorbent and smaller equipment being required than that required to carry out heretofore known processes.

SUMMARY OF THE INVENTION

The present invention is directed to an improved process for recovering condensible components from a gas stream utilizing a plurality of stationary adsorbent beds wherein during a first part of each cycle, a gas stream is passed through a first bed so that condensible components are adsorbed therefrom, the first part of each cycle being equal to the time required for the residue gas from the first bed to reach a condensible component content of a predetermined level. A second bed is simultaneously cooled with a cooling gas stream confined within a closed circuit so that the pressure level of the cooling gas stream is reduced and the second bed is prevented from becoming preloaded with condensible components during the cooling thereof. During the remainder of each cycle, the gas stream is passed serially through the first and second beds so that additional condensible components are adsorbed on the first bed, pressure is restored to the cooling gas stream and condensible components contained in the residue gas from the first bed are adsorbed on the second bed. A third bed is heated and stripped during each cycle with a regeneration gas stream and stripped condensible components are recovered from the regeneration gas stream.

It is, therefore, a general object of the present invention to provide an improved process for recovering condensible components from a gas stream.

A further object of the present invention is the provision of a process for recovering condensible components from a gas stream wherein a high percentage of the condensible components available in the gas stream are recovered utilizing a relatively small quantity of adsorbent as compared with heretofore known processes.

Yet a further object of the present invention is the provision of a process for recovering condensible components from a gas stream wherein the condensible component content of the residue gas stream is maintained at or below a predetermined maximum level even though a greater portion or all of the entire adsorption capacity of the adsorbing bed is utilized as compared to prior art processes.

Other and further objects, features and advantages of the present invention will be apparent from the following description of the presently preferred embodiments of the invention, given for the purpose of disclosure, and taken in conjunction with the accompanying drawings.

DESCRIPTION OF THE DRAWINGS

FIG. 3 illustrates the system of FIG. 1 with the main gas, cooling gas and regeneration gas stream flow patterns during the latter part of a cycle shown, FIG. 4 illustrates the system of FIG. 1 with the main gas, cooling gas and regeneration gas stream flow patterns during the next cycle shown, and FIG. 5 is a graph showing the composition-time profile of a residue gas stream produced from a stationary adsorbent bed.

DESCRIPTION OF THE PREFERRED EMBODIMENTS

Figure 1:
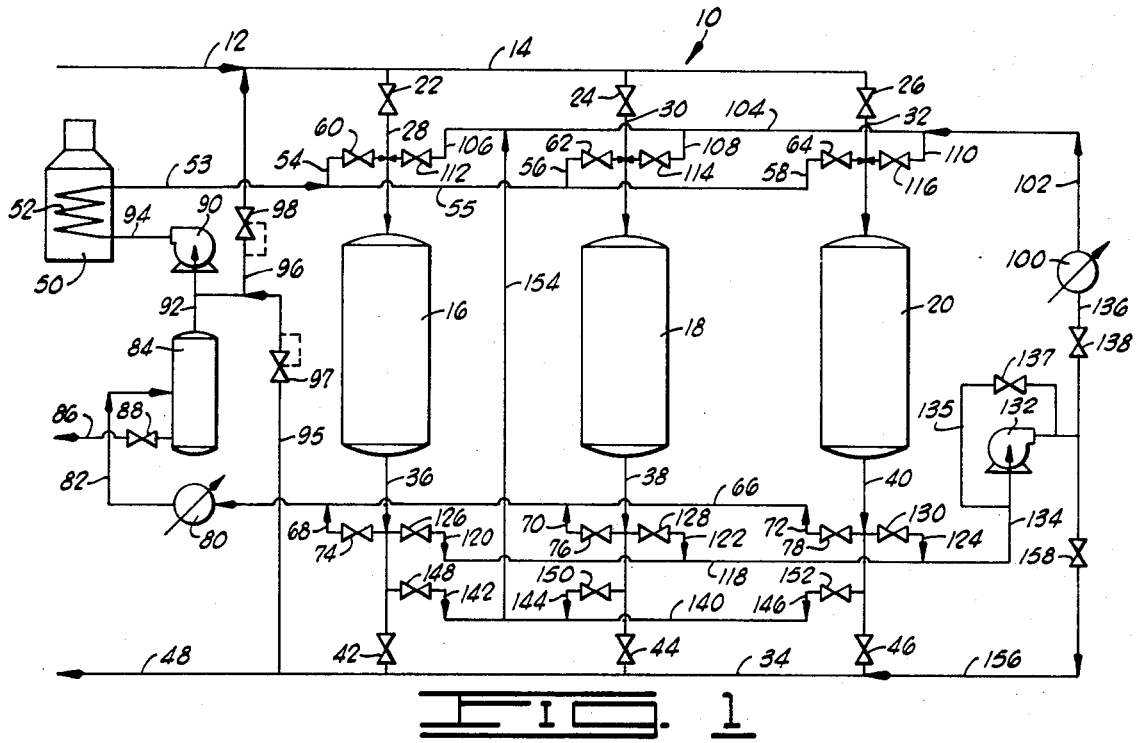
FIG. 1 illustrates in diagrammatic form a system for carrying out the process of the present invention.

Referring now to the drawings, and particularly to FIG. 1, a system for carrying out the method of the present invention is illustrated and generally designated by the numeral 10. A gas stream containing condensible components to be recovered is conducted to the system 10 by an inlet conduit 12. The conduit 12 is connected to an inlet or main gas header 14 from where the main gas stream is selectively routed to one of three stationary adsorbent beds contained in vessels 16, 18 and 20 by means of switching valves 22, 24 and 26 disposed in conduits 28, 30 and 32 respectively. The conduits 28, 30 and 32 are connected to the header 14 and to inlet connections disposed in the vessels 16, 18 and 20. A main residue gas header 34 is provided which is connected to outlet connections of the vessels 16, 18 and 20 by conduits 36, 38 and 40 respectively.

Switching valves 42, 44 and 46 are provided in the conduits 36, 38 and 40 for selectively routing residue gas from one of the vessels 16, 18 and 20 to the main residue gas header 34. The main residue gas header 34 is in turn connected to an outlet conduit 48 from where the residue gas from the system 10 is conducted to a point of use or distribution.

A regeneration gas circuit for continuously heating and stripping one of the adsorbent bed vessels 16, 18 or 20 is provided. The regeneration gas circuit basically comprises a conventional gas stream heater 50 having a heating coil 52 disposed therein. A hot regeneration gas header 55 is connected to the outlet connection of the heating coil 52 by a conduit 53, and conduits 54, 56 and 58 are connected to the header 55. The conduits 54, 56 and 58 are connected to conduits 28, 30 and 32 respectively which are connected to the adsorbent bed vessels 16, 18 and 20. Switching valves 60, 62 and 64 are disposed in the conduits 54, 56 and 58 respectively. A regeneration gas outlet header 66 is provided for receiving the regeneration gas from the vessels 16, 18 and 20, and conduits 68, 70 and 72 are connected to the header 66 and to conduits 36, 38 and 40 respectively. Switching valves 74, 76 and 78 are disposed in the conduits 68, 70 and 72. The header 66 is connected to the inlet of a conventional gas stream cooler 80, and the discharge of the cooler 80 is connected to a conduit 82 which is in turn connected to a conventional gas liquid separator 84. Liquids accumulated in the separator 84 are removed therefrom through a conduit 86 having a conventional liquid discharge valve 88 disposed therein. The gas outlet connection of the separator 84 is connected to a conventional gas stream compressor or blower 90 by a conduit 92. The discharge of the compressor 90 is connected to the inlet of the heating coil 52 of the heater 50 by conduit 94. A conduit 95 having a conventional pressure controlled valve 97 disposed therein is connected to the conduit 92 and to the main residue gas header 34. A conduit 96 having a conventional pressure controlled valve 98 disposed therein is connected to the conduit 92 and to the main gas header 14.

A cooling gas circuit is provided comprised of a conventional gas stream cooler 100, the discharge of which is connected by conduit 102 to a cooling gas inlet header 104. The header 104 is connected to the adsorbent bed vessels 16, 18 and 20 by conduits 106, 108 and 110 which are in turn connected to conduits 28, 30 and 32. Switching valve 112, 114 and 116 are disposed in conduits 106, 108 and 110 respectively. A cooling gas outlet header 118 is provided connected to conduits 120, 122 and 124 which are in turn connected to the conduits 36, 38 and 40 respectively. Switching valves 126, 128 and 130 are disposed in the conduits 120, 122 and 124 respectively. The cooling gas outlet header 118 is connected to a conventional compressor or blower 132 by conduit 134, and the discharge of the compressor 132 is connected to the inlet connection of the cooler 100 by a conduit 136. A bypass conduit 135 is provided connected to the conduits 134 and 136 and a switching valve 137 is disposed in the conduit 135. A switching valve 138 is disposed in the conduit 136 between the compressor 132 and the cooler 100.

An adsorbing bed residue gas switching circuit is provided comprised of a header 140 which is connected to the adsorbent bed vessels 16, 18 and 20 by way of conduits 142, 144 and 146 which are in turn connected to conduits 36, 38 and 40 respectively. Switching valves 148, 150 and 152 are disposed in the conduits 142, 144 and 146 respectively. The header 140 is connected by a conduit 154 to the cooling gas inlet header 104 which is in turn connected to the adsorbent bed vessels 16, 18 and 20 as previously described. A conduit 156 is provided connected to the conduit 136 and to the main residue gas header 34 having a switching valve 158 disposed therein.

As is well understood by those skilled in the art, the various switching valves described above may be any of a variety of pneumatically, hydraulically or electrically operated control valves, either two-way or three-way, or combinations of check valves as well as two-way and/or three-way valves may be used. The sequential opening and closing of the switching valves is automatically achieved by a central controller. Any of a variety of well known controllers, commonly referred to as time cycle controllers, may be utilized. The time cycle controller functions to automatically open certain of the switching valves and close others at the beginning of and during each cycle so that the flow patterns of the main gas stream, regeneration gas stream and cooling gas stream are switched in a predetermined desired manner which will be described hereinbelow.

The gas stream coolers 80 and 100 may be any conventional gas stream cooler apparatus, which functions to cool the regeneration gas and cooling gas streams to desired temperature levels. Commonly, atmospheric air or water cooled apparatus are used. In addition, as will be understood by those skilled in the art, various heat exchangers may be utilized in the system 10 to exchange heat between the various gas streams passing through the system to conserve heat and reduce the size of the gas coolers 80 and 100 as well as the gas heater 50.

The gas heater 50 may be any conventional gas stream heater apparatus which functions to raise the temperature level of the regeneration gas stream passing through the heating coil 52 thereof to a desired level. Commonly heaters of the natural gas direct fired type are utilized.

OPERATION

In operation of the system illustrated in FIG. 1 for carrying out the improved process of the present invention, the time cycle controller (not shown) is set up in a conventional manner so that the main gas, regeneration gas and cooling gas streams are sequentially switched by the switching valves described above through the adsorbent beds contained within the vessels 16, 18 and 20.

In order to present a clear understanding of the improved process of the present invention the flow patterns of the main gas, regeneration gas and cooling gas streams will be described from the beginning of a cycle through the beginning of the next cycle. As will be understood, the flow patterns of the main, regeneration and cooling gas streams are generally changed at the beginning of and during each cycle so that the adsorbent bed just adsorbing condensible components is heated and stripped, the bed just heated and stripped is cooled and the bed just cooled is adsorbing condensible components.

OPERATION DURING THE FIRST PART OF A CYCLE

Figure 2:
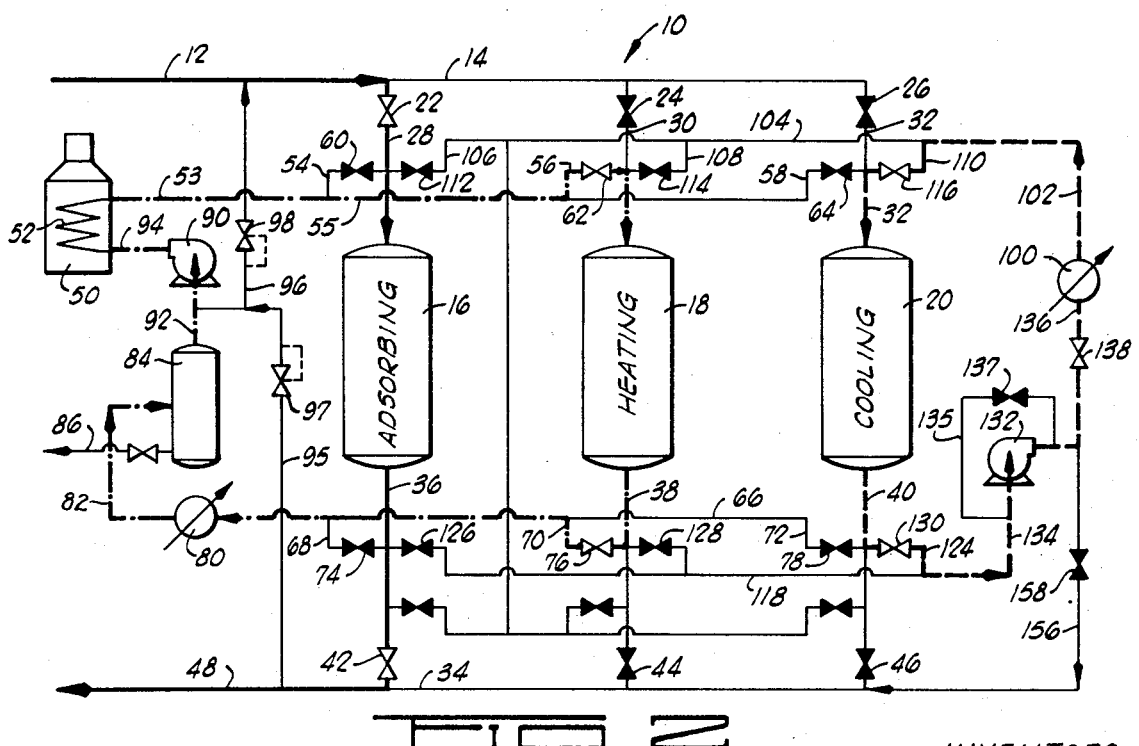
FIG. 2 illustrates in diagrammatic form the system of FIG. 1 with the main gas, cooling gas and regeneration gas stream flow patterns during the first part of a cycle shown thereon.

Referring particularly to FIG. 2 of the drawings, the flow patterns of the main gas, regeneration gas and cooling gas streams through the system of FIG. 1 are shown during the first part of a cycle. Specifically, the flow pattern of the main gas stream is shown by heavy solid lines, the flow pattern of the regeneration gas stream is shown by heavy alternatingly dashed and dotted lines, and the flow pattern of the cooling gas stream is shown by heavy dashed lines.

The main gas stream enters the system 10 through the inlet conduit 12 to the main gas header 14. The switching valve 22 disposed in the conduit 28 is open and the switching valves 24 and 26 disposed in conduits 30 and 32 are closed so that the main gas is caused to flow through the conduit 28 into the vessel 16 containing a bed of solid adsorbent previously cooled and preloaded as will be described below. Condensible components contained in the main gas stream are adsorbed on the bed of adsorbent contained in the vessel 16. The main residue gas stream from the vessel 16 passes through conduit 36; open switching valve 42 and into the main residue gas header 34. The switching valves 44 and 46 disposed in conduits 38 and 40 are closed thereby preventing the residue gas stream from vessel 16 from communicating with the adsorbent beds contained in vessels 18 and 20. The main residue gas is conducted from the header 34 to a point of use or distribution by the conduit 48.

A regeneration gas stream is pumped by the compressor 90 through the conduit 94 into the heating coil 52 disposed within the heater 50. While passing through the heating coil 52 of the heater 50 the regeneration gas stream is heated to a temperature level sufficient to heat the bed of adsorbent contained within the vessel 18 and strip condensible components previously adsorbed therefrom. From heating coil 52 the regeneration gas stream passes into the hot regeneration gas header 55 by way of conduit 53. From header 55 the hot regeneration gas stream passes through conduit 56 and open switching valve 62 into vessel 18 by way of conduit 30. Switching valves 60 and 64 disposed in conduits 54 and 58 are closed so that the regeneration gas stream is prevented from entering or communicating with the vessels 16 and 20. The regeneration gas stream entering the vessel 18 passes through the adsorbent bed contained therein thereby heating the bed and vaporizing and stripping condensible components previously adsorbed thereon out of the bed. The regeneration gas and the stripped condensible components pass into conduit 38 from where they are conducted to the regeneration gas outlet header 66 by way of conduit 70 and open switching valve 76. Switching valves 74 and 78 disposed in conduits 68 and 72 are closed thereby preventing regeneration gas from communicating with the vessels 16 and 20. From the header 66 the regeneration gas containing condensible components passes into the cooler 80 where it is cooled and the condensible components condensed. From the cooler 80 the regeneration gas stream and condensed components are conducted by the conduit 82 to the separator 84. While within separator 84 the regeneration gas stream is separated from the condensed or liquid components and is conducted from the separator 84 by way of the conduit 92 to the suction of compressor 90. The liquid components accumulating in separator 84 are removed therefrom through conduit 86 from where they are conducted to storage facilities. Volume changes in the regeneration gas stream throughout each cycle are compensated for by conventional pressure controllers 97 and 98. Specifically, as the volume of the regeneration gas stream decreases the pressure thereof decreases and pressure controller 97 opens allowing gas make-up to pass through conduit 95 from the residue gas header 34 into conduit 92. Conversely, as the regeneration gas stream volume increases the pressure thereof increases causing pressure controller 98 to open which in turn allows excess regeneration gas to pass from conduit 92 through conduit 96 into the main gas inlet header 14.

The cooling gas stream is pumped by compressor 132 into conduit 136 through open switching valve 138 to cooler 100. While passing through cooler 100 the cooling gas stream is cooled to a desired temperature level. The cooled gas stream then passes from cooler 100 by way of conduit 102 into cooling gas inlet header 104. From header 104 the cooling gas passes through conduit 110 and open switching valve 116 into adsorbent bed vessel 20 by way of conduit 32. Switching valves 112 and 114 disposed in conduits 106 and 108 are closed thereby preventing cooling gas from communicating with the vessels 16 and 18. The cooling gas stream entering the vessel 20 passes through the adsorbent bed contained therein causing the bed to be cooled. The cooling gas stream exits from the vessel 20 through the conduit 40, the conduit 124, open switching valve 130 into header 118. Switching valves 126 and 128 disposed in conduits 120 and 122 are closed thereby preventing the cooling gas stream within header 118 from communicating with the vessels 16 and 18. From the header 118 the cooling gas stream passes into conduit 134 from where it is led to the suction of the compressor 132. The switching valve 158 disposed in conduit 156 and switching valve 137 disposed in bypass conduit 135 are closed thereby preventing the cooling gas stream from entering the main residue gas header 34 and from bypassing the compressor 132.

The cooling gas circuit is not communicated with the main gas or regeneration gas streams passing through the system 10 thereby preventing condensible components other than those initially contained in the cooling gas stream from being adsorbed on the adsorbent bed contained in the vessel 20. As will be understood by those skilled in the art, condensible components initially contained in the cooling gas stream are adsorbed by the bed of adsorbent being cooled within the vessel 20 thereby reducing the volume of the cooling gas stream and causing the pressure thereof to decrease.

The above-described main gas, regeneration gas and cooling gas stream flow patterns are maintained during a first part of the cycle. That is, the main gas stream is passed through the adsorbent bed contained in vessel 16 for a period of time equal to the time required for the residue gas from the adsorbent bed contained within the vessel 16 to reach a condensible component content of a predetermined maximum level. Specifically, the first part of the cycle is equal to the breakthrough time plus the time required for the condensible component content of the residue gas stream to reach a level slightly below or at the maximum level. Referring to FIG. 5, the composition-time profile of a residue gas stream exiting from an adsorbent bed is illustrated by the curve 121. As may be seen from the curve 121 the breakthrough time occurs at 2.9 minutes. Assuming that the maximum residue gas condensible component content is 0.05 percent it may further be seen that at the end of 3.2 minutes the condensible component content of the residue gas stream reaches a level of 0.05 percent. Thus, for the residue gas stream illustrated by the curve 121 the flow patterns described above and illustrated in FIG. 2 would be maintained during the cycle for an initial time period of 3.2 minutes.

OPERATION DURING THE LATTER PART OF A CYCLE

At the end of the first part of the cycle, the flow patterns of the main gas and cooling gas streams are switched to those illustrated in FIG. 3. During the first part of the cycle, the pressure of the cooling gas stream confined within the cooling gas circuit decreases as mentioned above to a level below the pressure level of the main gas and regeneration gas streams. During the latter part of the cycle the circulation of cooling gas through the cooling gas circuit is stopped, i.e., compressor 132 is stopped and bypass switching valve 137 opened, and all or part of the residue gas stream from the vessel 16, which has reached a condensible component level at or near the maximum, is switched so that it is passed through the cooled adsorbent bed contained within the vessel 20 and pressure in the vessel 20 is restored.

The residue gas stream passing from the vessel 16 through the conduit 36 is caused to pass through the conduit 142 by way of open switching valve 148 into the header 140. The switching valve 42 is closed or partially closed so that all or part of the residue gas passing through the conduit 36 is prevented from entering the residue gas header 34. From the header 140 the residue gas stream from the vessel 16 passes through conduit 154 into the cooling gas header 104. From the cooling gas header 104 the gas stream passes into conduit 110 through the switching valve 116 into the vessel 20 thereby restoring pressure to the cooling gas stream. While passing through the cooled adsorbent bed within the vessel 20, condensible components contained in the residue gas stream from the vessel 16 are adsorbed thereon, thereby preloading the bed within the vessel 20 with condensible components and producing a residue gas stream below the maximum condensible component level. The residue gas from the adsorbent bed contained within the vessel 20 exits the vessel 20 through the conduit 40 and passes into the conduit 124 by way of open switching valve 130. From the conduit 124 the residue gas stream passes through the conduit 134, through the bypass conduit 135 and open switching valve 137 around the compressor 132, through the conduit 156 by way of open switching valve 158 and into the main residue gas header 34. From the main residue gas header 34 the residue gas stream is conducted to a point of use or distribution by way of conduit 48. The flow patterns illustrated in FIG. 3 are maintained during the latter part of the cycle for a period of time during which the adsorbent bed contained within the vessel 16 adsorbs additional condensible components. Thus, adsorption capacity of the adsorbing bed above that obtained when the residue gas from the adsorbing bed reaches the maximum condensible component content is achieved by the present invention bringing about the surprising result that less total adsorbent is required for a particular application as compared to heretofore known processes.

As will be understood, each of the switching valves 42, 44 and 46 may be throttling valves, and a conventional flow controller may be used to cause switching valves 42, 44 and 46 to devide the residue gas stream from the adsorbing bed into two portions during the latter part of each cycle, the first portion of which is passed through the bed just cooled and the second portion passed directly into the main residue gas header 34. The particular quantity of the portion of the residue gas passed through the cooled bed is adjusted so that upon mixing with the portion passed directly into the header 34, a total residue gas stream having a condensible component content below the maximum level results.

OPERATION DURING THE FIRST PART OF THE NEXT CYCLE

Referring to FIG. 4, the flow patterns of the main gas, regeneration gas and cooling gas streams are shown during the beginning of a next cycle. The main gas stream enters the system 10 through the conduit 12 and passes into the main gas header 14. It then passes through the conduit 32 by way of open switching valve 26 into the vessel 20. The bed of adsorbent contained within the vessel 20 has been cooled and preloaded during the latter part of the preceding cycle as described above, and as the main gas stream passes therethrough additional condensible components are adsorbed on the bed. The main residue gas from the adsorbent bed contained within the vessel 20 exits through the conduit 40 by way of the open switching valve 46 into the main residue gas header 34 from where it is conducted by conduit 48 to a point of use or distribution.

The regeneration gas stream is routed from the heating coil 52 of the regeneration gas heater 50 through the conduit 53 into the hot regeneration gas header 55.

From header 55 the hot regeneration gas is conducted to the vessel 16 by way of conduits 54 and 28 through open switching valve 60. The adsorbent bed contained within the vessel 16 has been loaded with adsorbed condensible components from the main gas stream in the preceding cycle which are vaporized and stripped from the bed by the regeneration gas stream passing therethrough. The regeneration gas stream and stripped condensible components exit the vessel 16 through conduits 36 and 68, open switching valve 74 and header 66. From header 66 the regeneration gas and stripped components pass through cooler 80 wherein the regeneration gas is cooled and the stripped components condensed. The stream then passes into separator 84 by way of conduit 82. After separation of the condensed components in separator 84, the regeneration gas stream passes through conduit 92 to the suction of compressor 90 from where it is pumped through conduit 94 into the heating coil 52 of the regeneration gas heater 50.

The cooling gas stream is routed to the adsorbent bed contained within the vessel 18 which was heated and stripped in the preceding cycle as described above. The cooling gas stream passes into the vessel 18 by way of conduit 108, open switching valve 114 and conduit 30. The cooling gas stream exits the vessel 18 by way of conduit 38, open switching valve 128, and conduit 122 and passes into the cooling gas outlet header 118. From cooling gas outlet header 118 the cooling gas stream passes through conduit 134 to the suction of compressor 132. The compressor 132 pumps the cooling gas stream into conduit 136 through open switching valve 138 and into cooler 100. From cooler 100 the cooling gas stream passes through conduit 102 into the cooling gas inlet header 104. Thus, the flow patterns of the main gas, regeneration gas and cooling gas streams are switched at the beginning of each cycle so that the adsorbent bed just heated and stripped is cooled, the adsorbent bed just cooled and preloaded is adsorbing condensible components from the main gas stream, and the adsorbent bed just adsorbing condensible components is heated and stripped. Further, during the latter part of each cycle all or part of the residue gas stream from the adsorbing bed is routed through the adsorbent bed just cooled so that the bed just cooled is

TABLE 1.—PROCESS VALVE SEQUENCE

| Valve | Switching Function | 1st cycle Beginning | 1st cycle Latter part | 2nd cycle Beginning | 2nd cycle Latter part | 3rd cycle Beginning | 3rd cycle Latter part |
|---|---|---|---|---|---|---|---|
| 22 | Main gas | Open | Open | Closed | Closed | Closed | Closed. |
| 24 | Do | Closed | Closed | do | do | Open | Open. |
| 26 | Do | do | do | Open | Open | Closed | Closed. |
| 42 | Main residue gas | Open | do | Closed | Closed | do | Do. |
| 44 | Do | Closed | do | do | do | Open | Do. |
| 46 | Do | do | do | Open | do | Closed | Do. |
| 112 | Inlet cooling gas | do | do | Closed | do | Open | Open. |
| 114 | do | do | do | Open | Open | Closed | Closed. |
| 116 | do | Open | Open | Closed | Closed | do | Do. |
| 126 | Outlet cooling gas | Closed | Closed | do | do | Open | Open. |
| 128 | do | do | do | Open | Open | Closed | Closed. |
| 130 | do | Open | Open | Closed | Closed | do | Do. |
| 60 | Inlet regn. gas | Closed | Closed | Open | Open | do | Do. |
| 62 | do | Open | Open | Closed | Closed | do | Do. |
| 64 | do | do | do | do | do | Open | Open. |
| 74 | Outlet regn. gas | do | do | Open | Open | Closed | Closed. |
| 76 | do | Open | Open | Closed | Closed | do | Do. |
| 78 | do | Closed | Closed | do | do | Open | Open. |
| 148 | Adsorbing bed residue gas | do | Open | do | do | Closed | Closed. |
| 150 | do | do | Closed | do | do | do | Open. |
| 152 | do | do | do | do | Open | do | Closed. |
| 137 | do | do | Open | do | do | do | Open. |
| 138 | do | Open | Closed | Open | Closed | Open | Closed. |
| 158 | do | Closed | Open | Closed | Open | Closed | Open. | preloaded and additional components are adsorbed on the adsorbing bed as described above.

Table I indicates the switching valve sequence of the system of FIG. 1 for carrying out the process of the present invention through three complete cycles.

The following examples will serve to further illustrate the process of the present invention.

EXAMPLE 1

In order to illustrate the surprising result brought about by the present invention, i.e., that the total adsorbent requirements are reduced for a particular application as compared to heretofore used processes the following example is given:

PROCESS DESIGN CONDITIONS

| | |
|---|---|
| Feed Gas Flowrate: | 500,000 lb./hr. |
| Weight % Condensible Components in Feed Gas: | 7% |
| Capacity of Adsorbent: | 0.10 lb. Condensible Components/lb. Adsorbent |
| Flowrate of Residue Gas from Adsorbing Bed: | 470,000 lb./hr. |
| Maximum Process Residue Gas Condensible Component Content: | 0.05% by weight |
| Composition-Time Profile of Residue Gas from Adsorbing Bed: | Shown in FIG. 5 |
| Gas Make-UP to Cooling Gas Stream: | 100,000 lb./hr. |

ADSORBENT REQUIREMENT FOR CONVENTIONAL PROCESS

For a conventional process wherein gas is continuously made up to the cooling gas stream from the main residue gas stream during each cycle, the following conventional calculations illustrate the process adsorbent requirement:

Referring to FIG. 5, the time at which 0.05 percent by weight condensible components are contained in the residue gas from the adsorbing bed is 3.2 minutes. Thus, the maximum cycle time which may be used to meet the maximum residue gas condensible component requirement is 3.2 minutes.

The quantity of condensible components fed into the adsorbing bed in 3.2 minutes $$= \begin{pmatrix} 500,000 \\ \text{lb./hr.} \\ \text{feed gas} \end{pmatrix} \begin{bmatrix} 7\% \\ \text{condensible} \\ \text{components} \\ \text{in feed gas} \\ \hline (100) \end{bmatrix} \left(\frac{1 \text{ hr.}}{60 \text{ min.}}\right)\left(\frac{3.2}{\text{min.}}\right)$$

$= 1{,}860$ lb. condensible components

Effective capacity of adsorbent $$= \left(\frac{0.10 \text{ lb. condensible}}{\text{components/lb. adsorbant}}\right)\left(\frac{3.2 \text{ min.}}{2.9 \text{ min.}}\right)$$

$= 0.11$ lb. condensible component/lb. adsorbent

The quantity of adsorbent per bed required per cycle $$= \frac{(1{,}860 \text{ lb. condensible components})}{0.11 \text{ lb. condensible components/lb. absorbent}}$$

$= 16{,}900$ lb. adsorbent.

The quantity of adsorbent required to hold the condensible components adsorbed on the cooling bed (preload) while it is being cooled and which are introduced to the cooling circuit by the cooling gas stream make-up is as follows:

The average composition of the cooling gas stream make-up gas $$= \frac{\text{area under curve 120 of Figure 1 from 0 to 3.2 min.}}{(3.2 \text{ min.})}$$

$$= \frac{(.3 \text{ min.})(0.25)}{(3.2 \text{ min.})}$$

$= 0.0023\%$ by weight

The quantity of condensible components fed to the cooling adsorbent in make-up gas $$= \left(\frac{100{,}000 \text{ lb./hr.}}{\text{make-up gas}}\left(\frac{3.2}{\text{min.}}\right)\right)\left(\frac{.0023\%}{\text{condensible}\atop\text{components}}\right)$$

$= 1.23$ lb. condensible components

The quantity of adsorbent required to hold make-up condensible components $$= \frac{(1.23 \text{ lb. condensible components})}{.10 \text{ lb. condensible components/lb. adsorbent}}$$

$= 12$ lb. adsorbent

The per bed adsorbent requirement at a cycle time of 3.2 min.

$= 16{,}900$ lb. $+ 12$ lb.

$= 16{,}912$ lb. adsorbent

For a cycle time of 20 minutes the quantity of adsorbent required $$= \frac{(16{,}912 \text{ lb.})(20 \text{ min.})}{(3.2 \text{ min.})}$$

$= 105{,}800$ lb. adsorbent

ADSORBENT REQUIREMENT FOR THE PROCESS OF THE PRESENT INVENTION

For the process of the present invention wherein no make-up gas is fed to the cooling gas circuit during the first part of the cycle, and during the remainder of the cycle, the residue gas stream from the adsorbing bed is switched to the cooling bed, the adsorbent requirements are as follows:

The first part of the cycle $= 3.2$ min.

Let the remainder of the cycle time $(t)$ equal the time required to restore pressure to the cooling circuit.

Make-up requirement $$= \frac{\left(\frac{100{,}000 \text{ lb./hr.}}{\text{make-up gas}}\right)}{(60 \text{ min./hr.})}(3.2 + t \text{ min.})$$

The available gas for make-up $$= \frac{(470{,}000 \text{ lb./hr.})(t \text{ min.})}{(60 \text{ min./hr.})}$$

Solving for $t$:

$$\frac{(100{,}000)(3.2+t)}{(60)} = \frac{(470{,}000)(t)}{(60)}$$

$t = 0.86$ minutes

Total cycle time $= 3.2 + 0.86$
$= 4.06$ min.

The per bed adsorbent requirement for the first part of the cycle $= 16{,}900$ lb.

The average condensible component composition of the make-up gas equals the average composition of the adsorbing bed residue gas from 3.2 minutes to 4.06 minutes.

Average composition $$= \frac{(0.002 - 0.0005)(100)}{(2)}$$

$$= 0.75\%$$

The quantity of condensible components fed to cooling adsorber (preload)

$$= \left(\frac{470{,}000 \text{ lb./hr. residue gas}}{(60 \text{ min./hr.})}\right)\left(\frac{0.86}{\text{min.}}\right)(0.00075)$$

$$= 5.04 \text{ lb.}$$

The quantity of adsorbent required to hold preload $$= \frac{(5.04 \text{ lb. condensible components})}{.10 \text{ lb. condensible components/lb. adsorbent}}$$

$$= 50 \text{ lb. adsorbent}$$

The per bed adsorbent requirement at a cycle time of 4.06 minutes $$= 16{,}900 \text{ lb.} + 50 \text{ lb.}$$

$$= 16{,}950 \text{ lb. adsorbent.}$$

For a cycle time of 20 minutes the quantity of adsorbent required $$= \frac{(16{,}950 \text{ lb.})(20 \text{ min.})}{(4.06 \text{ min.})}$$

$$= 83{,}600 \text{ lb.}$$

Thus, it may be seen that for a cycle time of 20 minutes substantially less adsorbent per bed is required to carry out the process of the present invention (83,600 lb.) as compared to a conventional process (105,800 lb.).

EXAMPLE 2

Water saturated raw natural gas is processed by a system as shown in FIG. 1 with the recovered condensible components being propane and heavier hydrocarbon compounds contained therein. A cycle time of 20 minutes is used, and the maximum propane and heavier content of the residue gas stream if 0.3 percent by weight.

Each of the vessels 16, 18 and 20 contains adsorbent beds comprised of 20,000 pounds of activated carbon adsorbent. During the first 15 minutes of each cycle the main gas stream is passed to a point of use or distribution directly from the adsorbing bed as shown in FIG. 2. For the last 5 minutes of each cycle the residue gas from the adsorbing bed is passed through the cooling bed prior to being conducted to the point of use or distribution as shown in FIG. 3.

Referring to FIG. 2, during the first part of the cycle, the feed gas enters the system 10 through the conduit 12 at a temperature of 100° F, a pressure of 500 psig and a flow rate of 20 mmscf/day. The feed gas stream passes through the main gas switching valve 22 and through the adsorbent bed contained in vessel 16. Propane and heavier hydrocarbon compounds are adsorbed from the main gas stream by the adsorbent bed and a 19 mmscf/day residue gas stream exits from the vessel 16 through the switching valve 42 and is conducted to a point of use or distribution by the conduit 48.

An 18 mmscf/day regeneration gas stream at a temperature of 100° F and pressure of 500 psig is pumped by the compressor 90 through the heating coil 52 of the heater 50 wherein the temperature of the regeneration gas stream is elevated to approximately 600° F. The hot regeneration gas stream exits the heating coil 52 and passes into the adsorber vessel 18 through switching valve 63. The bed of adsorbent contained within the vessel 18 is initially at a temperature of 120° F and is heated by the regeneration gas stream to an average temperature of 550° F thereby vaporizing and stripping the propane and heavier compounds previously adsorbed from the bed. The regeneration gas stream containing stripped pentane and heavier compounds and water exits the vessel 18 through switching valve 76 and passes into the cooler 80 at an average temperature of 130° F, the maximum temperature being 250° F. While within the cooler 80 the gas stream containing propane and heavier compounds is cooler to a temperature of approximately 100° F causing the propane and heavier compounds to be condensed. The resulting gas liquid mixture passes into separator 84 wherein 30 gallons/minute of the liquid propane and heavier compounds are separated and passed to storage through conduit 86. The regeneration gas stream remaining exits separator 84 and passes to the compressor 90 at a temperature of 100° F and a pressure of 500 psig.

A 19 mmscf/day cooling gas stream is pumped by compressor 132 through switching valve 138 into cooler 100 wherein the stream is cooled to a temperature of 100° F. The cooled gas stream passes through switching valve 116 into vessel 120. The bed of adsorbent contained within vessel 120 just previously heated is initially at a temperature of 550° F and the cooling gas stream exiting the vessel 120 through the switching valve 130 is at an initial temperature of 580° F. During the first part of each cycle as the cooling gas stream circulates through the cooling vessel 20 the pressure thereof decreases from an initial pressure of 500 psig to a pressure of about 330 psig. At the end of the first part of the cycle, the bed of adsorbent contained within the vessel 20 has been cooled to an average temperature of approximately 230° F.

Referring now to FIG. 3, at the end of the first part of the cycle (15 minutes) the residue gas from the vessel 16 has reached a propane and heavier component content of 0.3 percent by weight. Switching valve 42 is closed and switching valve 48 is opened thereby causing the residue gas stream from the vessel 16 to pass through the bed in vessel 20 previously cooled to an average temperature of 230° F. Pressure is made up to the vessel 20 and associated piping by the residue gas stream from the vessel 16. The residue gas stream from the adsorber 16 is at a temperature of about 125° F and the residue gas stream exiting from the cooling adsorber 20 is at a temperature of about 500° F. The residue gas stream from the adsorber 20 is routed through the compressor bypass 135, switching valve 137 and then through the switching valve 158 to the residue gas header from where it is conducted to a point of use or distribution by the conduit 48. At the end of the cycle (20 minutes) the flow patterns of the main gas, regeneration gas and cooling gas streams are switched as illustrated in FIG. 4 and the next cycle is started.

Although the figures illustrate a system utilizing three adsorbent beds and two-way switching valves, it will be understood by those skilled in the art that the principal of the present invention is applicable to systems using more or less than three adsorbent beds, and to various other switching valves and piping arrangements. Further, while a closed regeneration gas circuit has been described, an open type regeneration gas system may be employed.

Although the improved process of the present invention is particularly suitable for removing heavy hydrocarbon components and water from natural gas, it applies broadly to the removal of condensible components from any gas stream; for example, it may be used in processes for the removal of water from air, etc.

The present invention, therefore, is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed and claimed herein.

What is claimed is:

1. In a continuous cyclic process for recovering desired condensible components from a main gas stream utilizing a plurality of stationary adsorbent beds wherein during each cycle one of the adsorbent beds adsorbs condensible components from the gas stream producing a residue gas stream, another of the beds is simultaneously cooled and yet another of the beds is simultaneously heated and stripped, the improvement comprising:

passing the main gas stream during a first part of each cycle through a first bed so that condensible components are adsorbed therefrom, said first part of each cycle being equal to the time required for the residue gas stream from the first bed to reach a condensible component content of a predetermined level;

simultaneously cooling a second bed with a cooling gas stream confined within a closed circuit so that the pressure level of the cooling gas stream is reduced and the second bed is prevented from becoming preloaded with condensible components during the cooling thereof;

passing the main gas stream during the remainder of each cycle serially through the first and second beds so that additional condensible components are adsorbed on the first bed, pressure is restored to the cooling gas stream and condensible components contained in the residue gas stream from the first bed are adsorbed on the second bed;

heating and stripping condensible components from a third bed during each cycle with a regeneration gas stream; and condensing and recovering the stripped condensible components from the regeneration gas stream.

2. The process as set forth in claim 1 wherein each of said first, second and third beds is comprised of a plurality of stationary adsorption beds.

3. The process as set forth in claim 1 wherein said regeneration gas stream is continuously circulated in a closed circuit.

4. The process of claim 1 wherein the main gas stream is natural gas and the desired condensible components are water and heavy hydrocarbon components contained therein.

5. A process for recovering desired condensible components from a main gas stream which comprises the steps of:

passing the main gas stream through a stationary adsorbent bed so that said condensible components are adsorbed therefrom and so that a main residue gas stream is produced having a condensible component content below a predetermined level;

conducting the main residue gas stream to a point of use or distribution;

cooling another stationary adsorbent bed with a cooling gas stream confined within a closed circuit so that the pressure level of the cooling gas stream is reduced and the bed is cooled without becoming preloaded with condensible components during the cooling thereof;

changing the flow pattern of the main residue gas stream when the condensible component content thereof reaches a predetermined level whereby it passes through the cooled bed prior to being conducted to the point of use or distribution so that pressure is restored to the cooling gas stream, the cooled bed is preloaded with condensible components and the main residue gas stream continues to have a condensible component content below said predetermined level;

simultaneously heating and stripping yet another stationary adsorbent bed to remove condensible components therefrom; and continuously cycling the main gas, cooling gas and regeneration gas streams so that the bed just adsorbing condensible components is heated and stripped with the regeneration gas stream, the bed just cooled and preloaded adsorbs condensible components from the main gas stream, and the bed just heated and stripped is cooled with the cooling gas stream and preloaded with condensible components from the main residue gas stream.

6. The process as set forth in claim 5 wherein each of said stationary adsorbent beds comprises a plurality of stationary adsorbent beds.

7. The process as set forth in claim 5 wherein said regeneration gas stream is continuously circulated in a closed circuit.

8. The process as set forth in claim 5 wherein the main gas stream is natural gas and the desired condensible components are water and heavy hydrocarbon components contained therein.

9. A process for recovering desired condensible components from a main gas stream which comprises the steps of:

passing the main gas stream through a stationary adsorbent bed so that the condensible components are adsorbed therefrom and so that a main residue gas stream is produced having a condensible component content below a predetermined level;

conducting the main residue gas stream to a point of use or distribution;

cooling another stationary adsorbent bed with a cooling gas stream confined within a closed circuit so that the bed is cooled without becoming preloaded with condensible components during the cooling thereof;

passing a portion of the main residue gas stream through the cooled bed when the condensible component content of the main residue gas stream reaches said predetermined level so that the cooled bed is preloaded with condensible components and the portion of the main residue gas stream passed therethrough has a condensible component content below said predetermined level;

combining the portion of the main residue gas stream from the cooled bed with the remaining portion of the main residue gas stream thereby producing a combined main residue gas stream having a condensible component content below said predetermined level;

simultaneously heating and stripping yet another stationary adsorbent bed to remove condensible components therefrom; and continuously cycling the main gas, cooling gas and regeneration gas streams so that the bed adsorbing condensible components is heated and stripped with the regeneration gas stream, the bed just cooled and preloaded is adsorbing condensible components from the main gas stream, and the bed just heated and stripped is cooled with the cooling gas stream and preloaded with condensible components from the main residue gas stream.

10. The process as set forth in claim 9 wherein each of said stationary adsorbent beds is comprised of a plurality of stationary adsorption beds.

11. The process as set forth in claim 9 wherein said regeneration gas stream is continuously circulated in a closed circuit.

12. The process as set forth in claim 9 wherein the main gas stream is natural gas and the desired condensible components are water and heavy hydrocarbon components contained therein.

* * * * *